Figure 1:
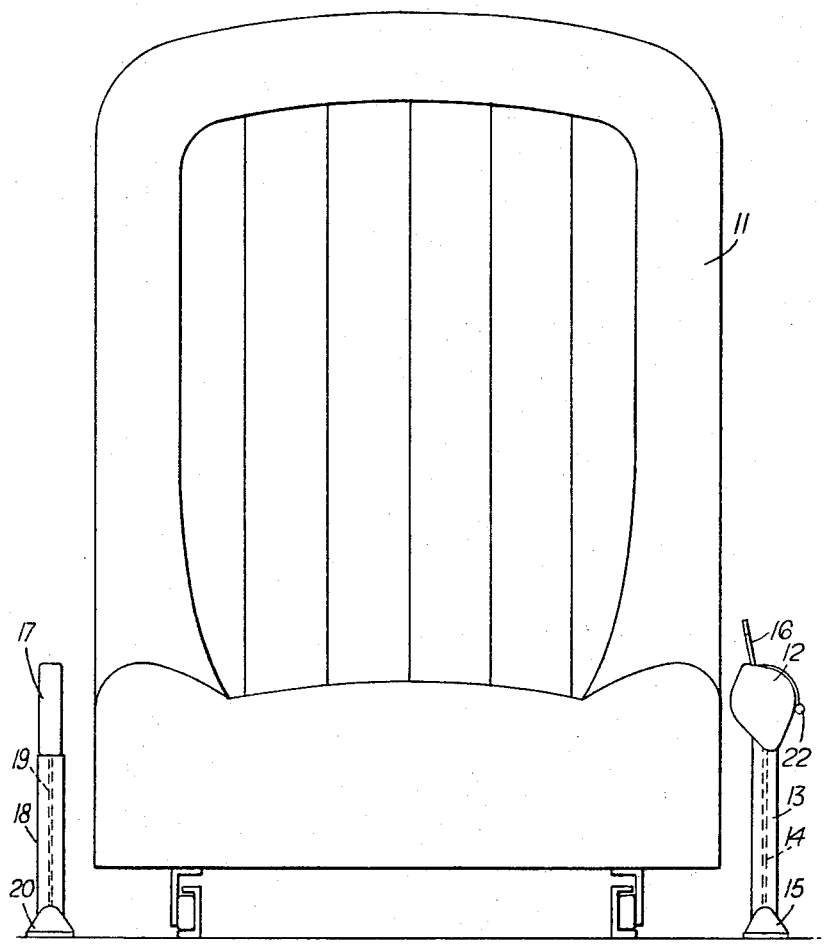

May 23, 1967    I. J. DAVIES ET AL    3,321,244
SAFETY HARNESSES

Filed July 22, 1965      5 Sheets-Sheet 5

3,321,244
SAFETY HARNESSES
Ivor John Davies, Thorpe Bay, and John Edward Humby, Rayleigh, England, assignors to Teleflex Products Limited, Basildon, England, a British company
Filed July 22, 1965, Ser. No. 473,978
12 Claims. (Cl. 297—388)

This invention relates to safety harnesses, and especially seat harnesses for travellers in motor cars. It is a primary object of the invention to provide a harness which is easy for a seat occupant to manipulate, and which is unobstrusive and stowed in a tidy condition when not in use.

In conventional car seat harnesses a lap strap is provided, either alone or in combination with another strap or straps, to prevent the occupant parting company with the seat. Such a lap strap is usually in two portions extending from opposite sides of the seat and joined by a buckle in the region of the wearer's abdomen. This arrangement has the following principle disadvantages. To use the lap strap the seat occupant has first to grope on the floor of the car for the two portions, untangling them if necessary; then the co-operating parts of a metal buckle on the two portions of the strap have to be introduced to one another and locked together, and also the strap must be adjusted to the correct length. When the harness is in use the aforesaid metal buckle is against the wearer's body whereas it is desirable that there should be no metal or similarly hard parts so located. And when the harness is not in use the two portions of the lap strap lie on the floor to be trodden on and become soiled and tangled. Quite apart from the efficacy of the harness in protecting the wearer it has to be borne in mind that any harness may be of little value to the ordinary car traveller if it requires special skill to don and adjust it or if it is regarded as a nuisance such that the seat occupant is disinclined to wear it.

According to the invention, a seat safety harness comprises a harness lap strap that is reeled up, or largely reeled up, when not in use on a harness retraction reel at one side of the seat where there is a first anchorage for the strap, and the strap can be drawn across the body of an occupant of the seat and releasably secured to a second anchorage on the opposite side, the harness reel incorporating a lock device to prevent unreeling of additional strap which lock device is inoperative so as to permit unreeling when the strap is being drawn across the seat occupant's body but is rendered operative automatically by the action of securing the strap to said second anchorage.

In one arrangement, the accessible end of the reeled strap may be secured to the first anchorage, the strap being unreeled across the seat occupant's body by carrying of the reel from a parked position at or near the first anchorage to a position at or near the second anchorage where it can be secured by means of a quick release latch device a first part of which is permanently associated with the second anchorage while a second part is on the reel.

In an alternative arrangement, the reel may be fixed at the first anchorage and the harness made operational by pulling of the accessible end of the strap across the seat occupant's body, the end of the strap, in this case, carrying the second part of the latch device and there being an operative connection, such as a motion-transmitting cable connection, between the permanently anchored first part of the latch device on one side of the seat and the retraction reel on the opposite side to effect the automatic locking of the reel.

Either arrangement provides a harness lap strap which can be quickly and easily fastened by a wearer, which does not require manual adjustment because it is automatically reeled to the appropriate length and tension by the retraction reel, and which is reeled away tidily when not in use. Furthermore, no metal part is in contact with the wearer's body during use.

By way of illustration, two examples of seat harnesses embodying the invention will now be described with reference to the accompanying drawings.

Figure 2:
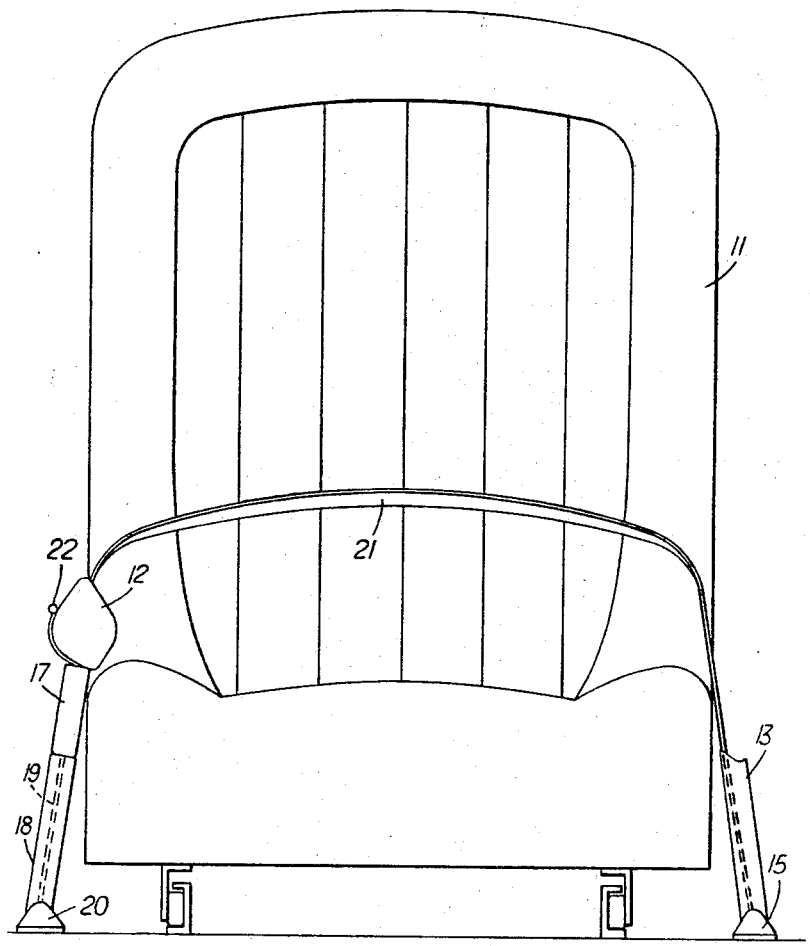
Figure 3:
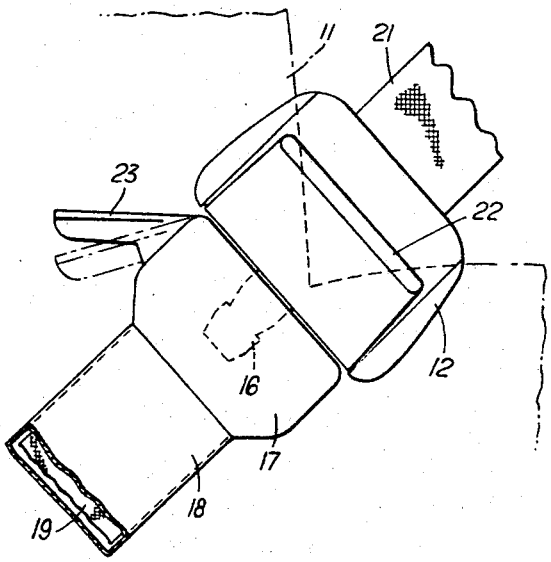

In the drawings:

FIGURE 1 is a front elevation of a car seat fitted with a lap strap according to the invention, and showing the strap in the stowed position, FIGURE 2 is a view corresponding to FIGURE 1 showing the lap strap in the position of use, FIGURE 3 is a detail side elevation in the direction of the arrow 3 of FIGURE 2, and FIGURES 4 to 6 are views, corresponding respectively to FIGURES 1 to 3, of the second embodiment.

FIGURES 1, 2 and 3 of the drawings show an arrangement in which a harness reel is carried over from one side of the seat to the other to render the harness operational. In FIGURE 1 the harness is in the stowed condition. At one side of the seat 11 the harness reel 12 rests at a convenient height on the top of a forwardly-inclined hollow stalk 13 upstanding from the vehicle floor, which stalk is preferably made in a synthetic plastic material. A harness strap is, for the most part, reeled up on the reel except that a short length of it extends down within the stalk, as indicated at 14, and is anchored at its end to a strong point at 15 on the vehicle floor. The harness reel has projecting at its exterior a latching tongue 16 which is adapted to plug into a receptor 17 therefore at the opposite side of the seat. The receptor 17 also rests on the top of a forwardly-inclined hollow stalk 18, preferably of synthetic plastic material, and it has a short length of strap or webbing 19 extending down within the stalk to a floor anchorage 20. The two stalks 13, 18 are are each pivotally mounted on the vehicle floor.

FIGURE 2 shows the harness operational. In this view the harness reel 12 has been lifted off the stalk 13 and carried across the seat, with consequent unreeling of the strap thereon to form a lap strap 21 for the seat occupant. And the latching tongue on the reel has been plugged into the receptor 17 where it is automatically locked in position, the locking action being preferably similar to that of the harness release device described in our copending patent application No. 463,745.

The harness reel 12 is of a type which automatically reels away slack strap under spring action, and it has a locking device which, when operative, prevents more strap being reeled out. When the harness is being carried across the seat its locking device is inoperative but the action of plugging the latching tongue 16 of the reel into the receptor 17 automatically renders the lock operative. The reel consequently tightens the strap around the seat occupant's lower torso, by reeling away any slack, and positively locks the strap against extension thereof.

To enable the seat occupant to make body movements requiring extension of the lap strap 21, a lock over-ride bar 22 is provided on the reel 12 as best seen in FIGURE 3. Manual depression of the bar 22 renders the reel locking device inoperative and allows the strap to unreel so long as the bar 22 is held down. When the over-ride bar 22 is released tightening and locking of the strap occurs as before.

To release the harness, a trigger lever 23 on the receptor 17 is manually depressed. This unlatches the tongue 16 and allows the reel to wind in the lap strap until it has parked itself back on the stalk 13.

Figure 6:
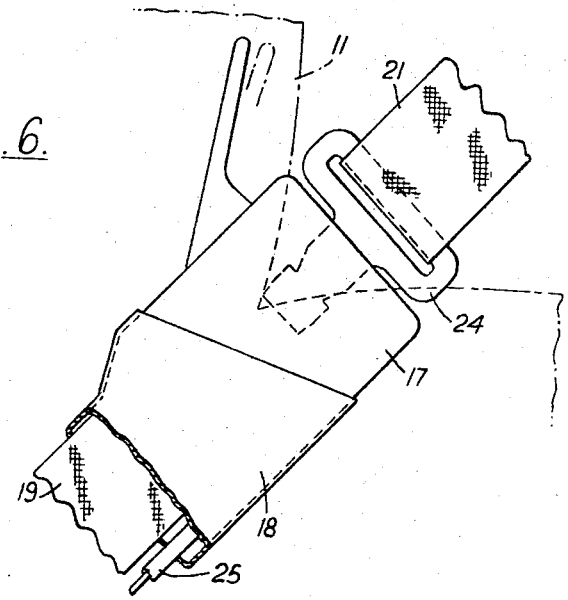
Figure 4:
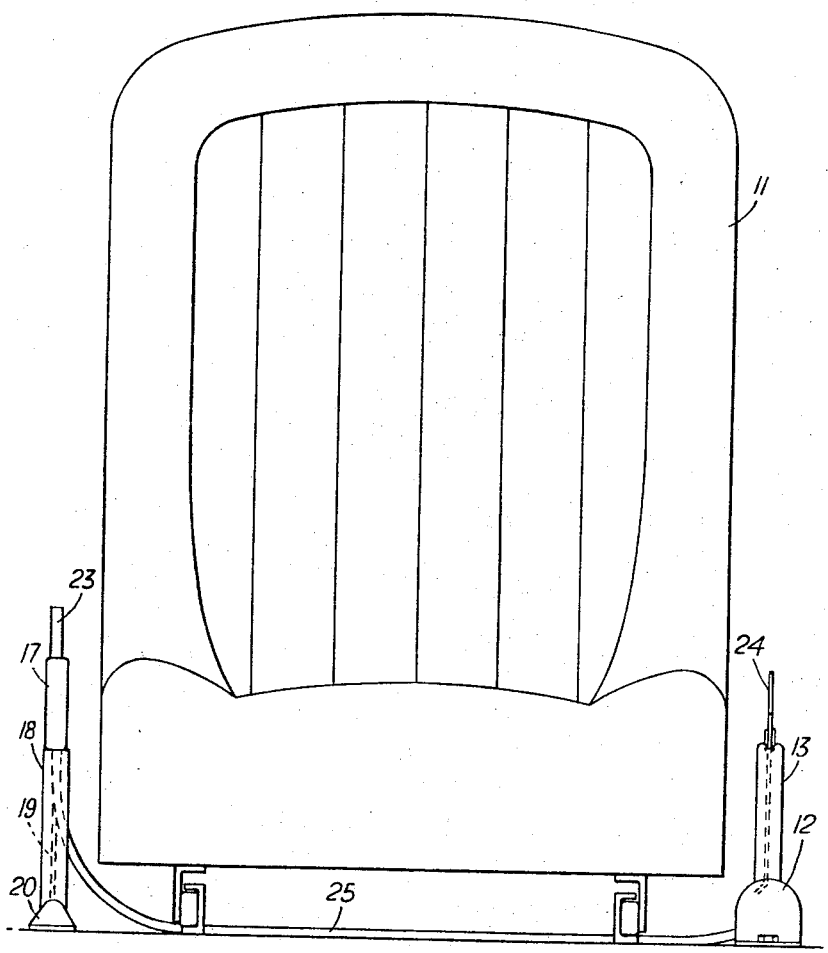
Figure 5:
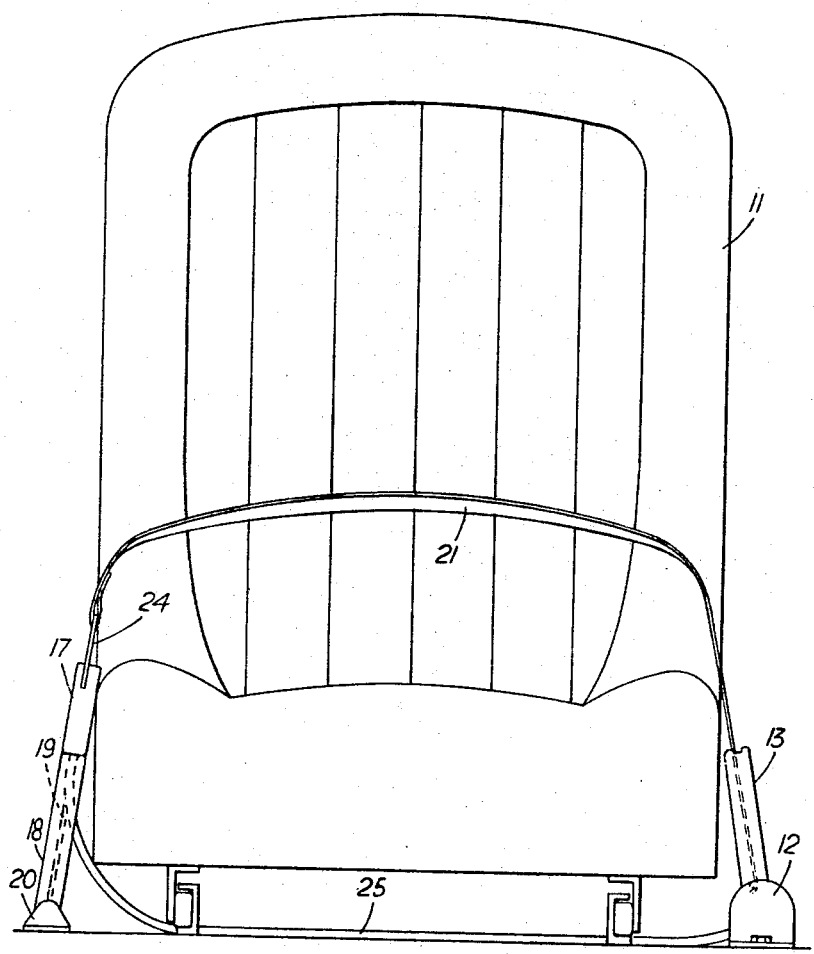

The harness described above is shown fitted to an independent or split type of motor car seat. It can also be applied to bench seats, but for this the alternative harness arrangement shown in FIGURES 4 to 6 is preferred. In this case the harness reel 12 is permanently fixed at the foot of the stalk 13 and the strap extends up through the stalk with a connector 24 on its end resting on the top of the stalk when the harness is out of use. The connector 24 is similar to the male portion of the release device described in our copending patent application No. 463,745. To render the harness operational, the connector 24 is carried across the body of the seat occupant, instead of the harness reel as in the previous arrangement, and is plugged into the receptor 17 on the opposite side of the seat.

The function of the harness reel, in reeling in and locking the strap, is the same as before. However, since the reel is no longer carried over to the receptor 17 it is necessary to provide a control motion transmission between the receptor and the reel to operate the reel lock and this takes the form of a flexible control cable 25. The cable connection 25 also transmits lock over-ride control to the reel; as before there is a trigger lever 23 on the receptor 17 which is depressed to release the harness, and this trigger lever now also provides the lock over-ride control in that raising the trigger lever away from the receptor body, to the position shown at 26 in FIGURE 6, renders the reel lock inoperative for as long as the trigger is held raised.

It is recognized that to be complete in its protection a car seat harness should preferably comprise a strap or straps to prevent the occupant parting company with the seat, which function is commonly fulfilled by the lap strap, and also a strap or straps to prevent the seat occupant's body from jack-knifing forward and striking the vehicle instrument panel and windscreen. This second function is usually performed by a so-called diagonal strap extending from a point of attachment to the lap strap obliquely up and across the wearer's chest and one shoulder to a side anchorage point at about the level of the wearer's head.

However, such a diagonal strap has disadvantages, as discussed in our copending patent application No. 463,745 and it is preferred to employ, in combination with the lap strap of the present invention, an arrangement of twin shoulder straps as described and claimed in said copending patent application.

We claim:

1. A seat safety harness comprising first anchorage means clear of the seat at one side thereof, second anchorage means clear of the seat at the other side thereof, a single harness lap strap having an end permanently connected to said first anchorage and a portion portable across the seat, a harness retraction reel whereon said harness lap strap is reeled up at said first anchorage clear of the seat when not in use, said harness retraction reel including a retraction spring acting to reel in slack strap and a normally inoperative reel lock operable to lock the reel against turning in the direction to pay out strap but not to prevent reeling in of strap under the action of said retraction spring, a two-part manually releasable latch device a first part of which is mounted on said second anchorage while the second part is carried on the portable portion of said strap whereby when the strap has been drawn across the seat the two parts of the latch device can be mated to releasably secure said strap to said second anchorage, and reel-lock-operating means associated with said two-part latch device whereby mating of said two latch device parts automatically operates said reel lock.

2. A harness according to claim 1, wherein the reel is portable with the strap across the seat, the strap being unreeled across the seat occupant's body by carrying of the reel from a parked position at the first anchorage to a position at the second anchorage where it is securable by means of said latch device, said second part of said latch device being on the reel.

3. A harness according to claim 1, wherein the reel is fixed at the first anchorage and the harness is made operational by pulling of the second end of the strap across the seat occupant's body and securing it to the second anchorage by means of said latch device, said second part of said latch device being on said second strap end, and there being an operative connection between said first part of the latch device on one side of the seat and the retraction reel on the opposite side to effect the automatic locking of the reel.

4. A harness according to claim 3, wherein said operative connection comprises a mechanical motion-transmitting cable connection.

5. A harness according to claim 1, wherein a manual control is provided whereby the reel lock can be disabled at will to allow freedom of movement to the seat occupant, irrespective of the fact that the strap is secured to the second anchorage.

6. A harness according to claim 3, wherein a manual reel lock release control is located on the first part of the latch device associated with the second anchorage and operates on the reel through said operative connection.

7. A harness according to claim 2, wherein said anchorages include two hollow stalks upstanding on opposite sides of the seat and attached at their lower ends to the vehicle floor, and the stowed position of the reel is atop one stalk while said first part of the latch device is atop the other stalk.

8. A harness according to claim 7, wherein said first part of the latch device is anchored by means of a short length of strap extending down to a floor fixing through the stalk on the top of which said part is mounted, and the strap from the reel extends down to a floor fixing through the other stalk.

9. A harness according to claim 3, wherein said anchorages include two hollow stalks upstanding on opposite sides of the seat and attached at their lower ends to the vehicle floor, the reel is fixed to the floor at the foot of one stalk with the strap extending therefrom up through the hollow stalk, the stowed position of said second part of the latch device being atop that stalk, and the first part of the latch device is atop the other stalk.

10. A harness according to claim 9, wherein said first part of the latch device is anchored by means of a short length of strap extending down to a floor fixing through the stalk on the top of which said part is mounted.

11. A harness according to claim 8, wherein the stalks are pivotally mounted on the floor at their lower ends and are inclined forwardly from their floor mountings in the direction in which the seat occupant faces.

12. A harness according to claim 11, wherein the stalks are of synthetic plastic material.

References Cited by the Examiner

UNITED STATES PATENTS

| | | | |
|---|---|---|---|
| 3,147,996 | 9/1964 | Ferrara et al. | 297—388 |
| 3,171,688 | 3/1965 | Nicholas | 297—388 |
| 3,174,704 | 3/1965 | Replogle | 242—107.4 |
| 3,227,489 | 1/1966 | Stubblefield | 297—388 |
| 3,233,296 | 2/1966 | Whittingham | 297—388 X |
| 3,248,148 | 4/1966 | Board et al. | 297—388 |
| 3,249,386 | 5/1966 | Board et al. | 297—388 |

CASMIR A. NUNBERG, *Primary Examiner.*